US009043563B2

(12) United States Patent
Birkestrand et al.

(10) Patent No.: US 9,043,563 B2
(45) Date of Patent: *May 26, 2015

(54) DYNAMICALLY IMPROVING MEMORY AFFINITY OF LOGICAL PARTITIONS

(71) Applicant: International Business Machines Corporation, Armonk, NY (US)

(72) Inventors: Daniel C. Birkestrand, Rochester, MN (US); Peter J. Heyrman, Rochester, MN (US); Wade B. Ouren, Rochester, MN (US); Edward C. Prosser, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/707,759

(22) Filed: Dec. 7, 2012

(65) Prior Publication Data

US 2014/0136801 A1 May 15, 2014

Related U.S. Application Data

(63) Continuation of application No. 13/675,701, filed on Nov. 13, 2012.

(51) Int. Cl.
*G06F 12/02* (2006.01)
*G06F 12/00* (2006.01)

(52) U.S. Cl.
CPC .............. *G06F 12/00* (2013.01); *G06F 12/023* (2013.01); *G06F 12/0292* (2013.01)

(58) Field of Classification Search
CPC . G06F 11/0712; G06F 9/5077; G06F 9/5033; G06F 11/3433; G06F 11/3495; G06F 12/00; G06F 9/5016; G06F 12/109; G06F 9/5027; G06F 12/023; G06F 2009/45583; G06F 2209/5021
USPC .................................................. 711/153, 173
See application file for complete search history.

(56) References Cited

U.S. PATENT DOCUMENTS

| | | | |
|---|---|---|---|
| 6,912,625 B2 | 6/2005 | Foster et al. | |
| 7,673,114 B2 | 3/2010 | Allen et al. | |
| 8,020,165 B2 | 9/2011 | Rangarajan et al. | |
| 8,224,955 B2 | 7/2012 | Vaidyanathan et al. | |
| 2006/0253682 A1* | 11/2006 | Armstrong et al. | 711/173 |
| 2007/0073993 A1* | 3/2007 | Allen et al. | 711/170 |
| 2007/0168635 A1* | 7/2007 | Allen et al. | 711/173 |
| 2007/0260827 A1* | 11/2007 | Zimmer et al. | 711/154 |
| 2012/0246174 A1* | 9/2012 | Spears et al. | 707/749 |
| 2013/0218869 A1* | 8/2013 | McConnell et al. | 707/722 |

* cited by examiner

*Primary Examiner* — Hashem Farrokh
(74) *Attorney, Agent, or Firm* — Martin & Associates, LLC; Derek P. Martin (57) ABSTRACT

In a computer system that includes multiple nodes and multiple logical partitions, a dynamic partition manager computes current memory affinity and potential memory affinity to help determine whether a reallocation of resources between nodes may improve memory affinity for a logical partition or for the computer system. If so, the reallocation of resources is performed so memory affinity for the logical partition or computer system is improved. Memory affinity is computed relative to the physical layout of the resources according to a hardware domain hierarchy that includes a plurality of primary domains and a plurality of secondary domains.

11 Claims, 10 Drawing Sheets

| LP ID | Spread Type | Processors | Mem (GB) | Sec. Domain | Pri. Domain |
|---|---|---|---|---|---|
| 1 | CiP | 2 | 4 | 0 | 0,1 |
| 2 | CiS | 5 | 20 | 0,1 | 0,2 |
| 3 | SaS | 16 | 64 | 0,1,2 | 1,2,3,4,5 |
| 4 | WiF | 2 | 4 | 2,3 | 5,6 |

FIG. 3

| LP ID | Domain 0 | | Domain 1 | | Domain 2 | | Domain 3 | |
| | Domain 4 | | Domain 5 | | Domain 6 | | Domain 7 | |
| | Procs | Mem | Procs | Mem | Procs | Mem | Procs | Mem |
|---|---|---|---|---|---|---|---|---|
| 1 | 1 | 4 | 1 | | | | | |
| 2 | 3 | 12 | | | 2 | 8 | | |
| 3 | 8 | | 3 / 1 | 16 | 2 | 8 | 2 | 40 |
| 4 | | | 2 | | 4 | | | |

| Domain Type | Example |
|---|---|
| Primary | Within a Chip |
| Secondary | Within a Node/Drawer |

FIG. 8 memory affinity =

$$\sum_{1}^{n}(RawScore\_f(SpreadType))*(PageTableAdjustment)*(WeightAdjustment)\\*(SharedMemoryAdjustment)$$

where  n = the number logical partitions in the system cluster;
      SpreadType is a category based on the hardware domain hierarchy;
      PageTableAdjustment is a multiplier based on proximity of page table(s);
      WeightAdjustment is a multiplier based on logical partition resources as a percentage of all resources in the computer system; and
      SharedMemoryAdjustment is a multiplier based on memory shared with other logical partitions.

| LP ID | Domain 0 | | Domain 1 0 | | Domain 2 | | Domain 3 1 | |
|---|---|---|---|---|---|---|---|---|
| | Domain 4 | | Domain 5 2 | | Domain 6 | | Domain 7 3 | |
| | Procs | Mem | Procs | Mem | Procs | Mem | Procs | Mem |
| 1 | 2 | 4 | | | | | | |
| 2 | 3 | 12 | 2 | 8 | | | | |
| 3 | 4 | 16 | 4 | 16 | 2 2 | 8 8 | 2 2 | 8 8 |
| 4 | 1 1 | 2 2 | | | | | | |

DYNAMICALLY IMPROVING MEMORY AFFINITY OF LOGICAL PARTITIONS

BACKGROUND

1. Technical Field

This disclosure generally relates to computer systems, and more specifically relates to computer systems that include multiple logical partitions on multiple nodes.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

More recent developments in the field of logical partitioning support dynamic allocation of resources as logical partitions are running, and support defining logical partitions across multiple nodes in a computer system. The ability to dynamically allocate resources as logical partitions are running gives rise to issues relating to memory affinity in a logical partition. Memory affinity for a logical partition is defined herein to be the ratio of the logical partition's memory per node to the logical partition's processors per node. Memory affinity is important when logical partitions may span across nodes because an access by a processor in a logical partition in a node is much faster to memory on the same node than to memory on a different node. For this reason, we want to assure that each processor on a node has corresponding memory. If this is possible, perfect memory affinity may be achieved.

When logical partitions are first started, the partition manager may create the logical partitions with perfect memory affinity, meaning that each processor has a corresponding amount of memory on each node, or with similar memory affinity for all logical partitions if perfect memory affinity cannot be achieved. Note, however, that dynamic reallocation of resources may negatively impact the memory affinity of one or more logical partitions. As time goes on, it is possible for the memory affinity of a logical partition to degrade to the point of being a significant negative impact on performance of the logical partition.

BRIEF SUMMARY

In a computer system that includes multiple nodes and multiple logical partitions, a dynamic partition manager computes current memory affinity and potential memory affinity to help determine whether a reallocation of resources between nodes may improve memory affinity for a logical partition or for the computer system. If so, the reallocation of resources is performed so memory affinity for the logical partition or computer system is improved. Memory affinity is computed relative to the physical layout of the resources according to a hardware domain hierarchy that includes a plurality of primary domains and a plurality of secondary domains.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a way to compute current memory affinity and potential memory affinity to help determine whether a reallocation of resources between nodes may improve memory affinity for a logical partition or for the computer system. If so, the reallocation of resources is performed so memory affinity for the logical partition or computer system is improved. Memory affinity is computed relative to the physical layout of the resources according to a hardware domain hierarchy that includes a plurality of primary domains and a plurality of secondary domains.

Figure 1:
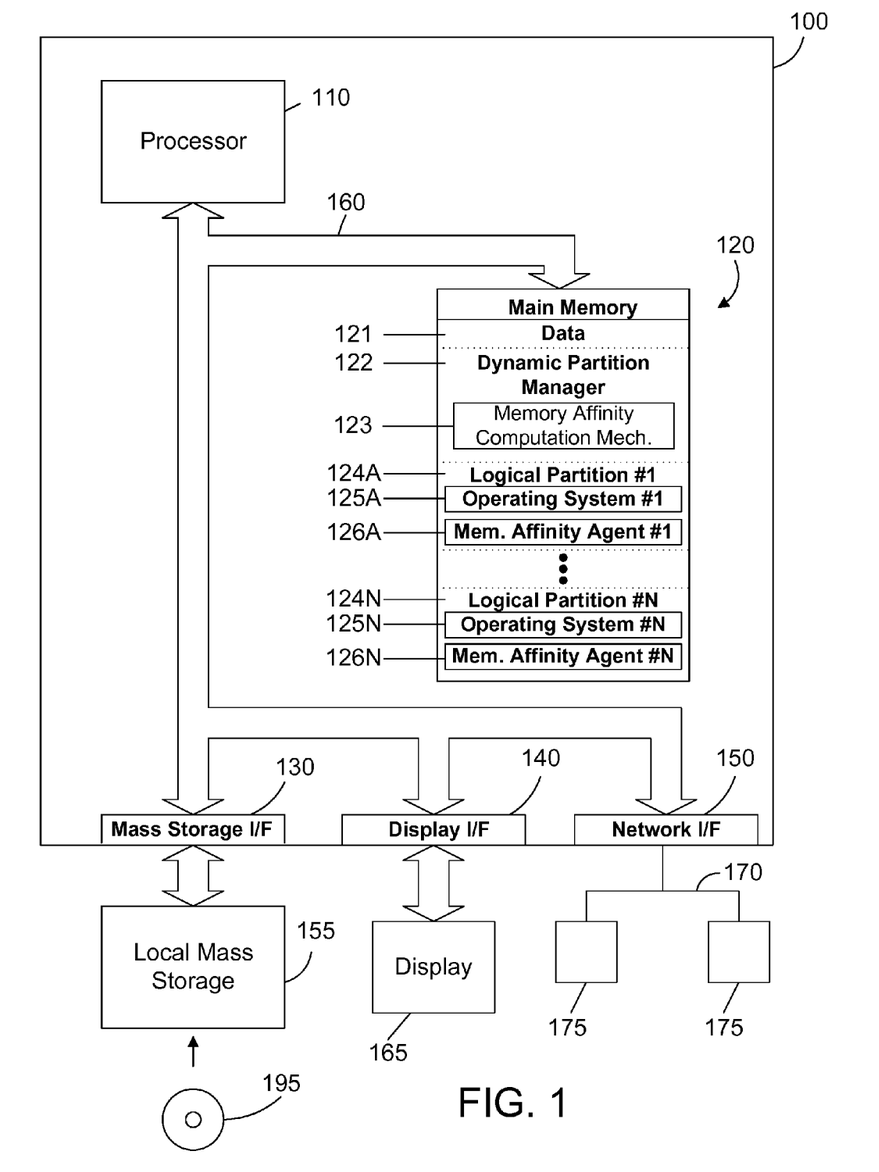
FIG. 1 is a block diagram of a computer system that includes a memory affinity computation mechanism.

Referring to FIG. 1, a computer system 100 is one suitable implementation of a server computer system that includes a dynamic partition manager. Server computer system 100 is an IBM iSeries computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, a dynamic partition manager 122, and multiple logical partitions 124, shown in FIG. 1 as 124A, ..., 124N. Data 121 represents any data that serves as input to or output from any program in computer system 100. Dynamic partition manager 122 is a sophisticated program that contains low-level code to manage the resources of computer system 100. Some of these resources are processor 110, main memory 120, mass storage interface 130, display interface 140, network interface 150, and system bus 160. Dynamic partition manager 122 includes a memory affinity computation mechanism 123 that allows the dynamic partition manager 122 to compute a current memory affinity based on the current allocation of resources, and to compute a potential memory affinity based on a proposed reallocation of resources. The dynamic partition manager may compute current memory affinity and potential memory affinity for any individual logical partition, and may also compute current memory affinity and potential memory affinity for the overall computer system. Dynamic partition manager 122 preferably creates the N logical partitions 124. Each logical partition 124 preferably includes a corresponding operating system, shown in FIG. 1 as operating systems 125A through 125N, and a corresponding memory affinity agent, shown in FIG. 1 as memory affinity agents 126A through 126N.

The operating system in each logical partition is a multi-tasking operating system, such as i5/OS, AIX, or Linux; however, those skilled in the art will appreciate that the spirit and scope of the present invention is not limited to any one operating system. Any suitable operating system can be used. The operating system in each logical partition may be the same as the operating system in other logical partitions, or may be a completely different operating system. Thus, one logical partition can run the i5/OS operating system, while a different logical partition can run another instance of i5/OS, possibly a different release, or with different environment settings (e.g., time zone or language). The operating system in each logical partition could even be different than i5/OS, provided it is compatible with the hardware (such as AIX or Linux). In this manner the logical partitions can provide completely different computing environments on the same physical computer system.

The logical partitions 125A-125N are shown in FIG. 1 to reside within the main memory 120. However, one skilled in the art will recognize that a logical partition is a logical construct that includes resources other than memory. A logical partition typically specifies a portion of memory, along with an assignment of processor capacity and other system resources. Thus, one logical partition could be defined to include two processors and a portion of memory 120. Another logical partition could then be defined to include three other processors and a different portion of memory 120. The logical partitions are shown in FIG. 1 to symbolically represent logical partitions, which would include system resources outside of memory 120 within computer system 100. Note also that the dynamic partition manager 122 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, dynamic partition manager 122, and logical partitions 124A, ..., 124N are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the dynamic partition manager 122. Processor 110 also executes the operating systems 125A, ..., 125N in the respective logical partitions 124A, ..., 124N.

Although computer system 100 is shown to contain only a single processor and a single system bus, those skilled in the art will appreciate that a dynamic partition manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
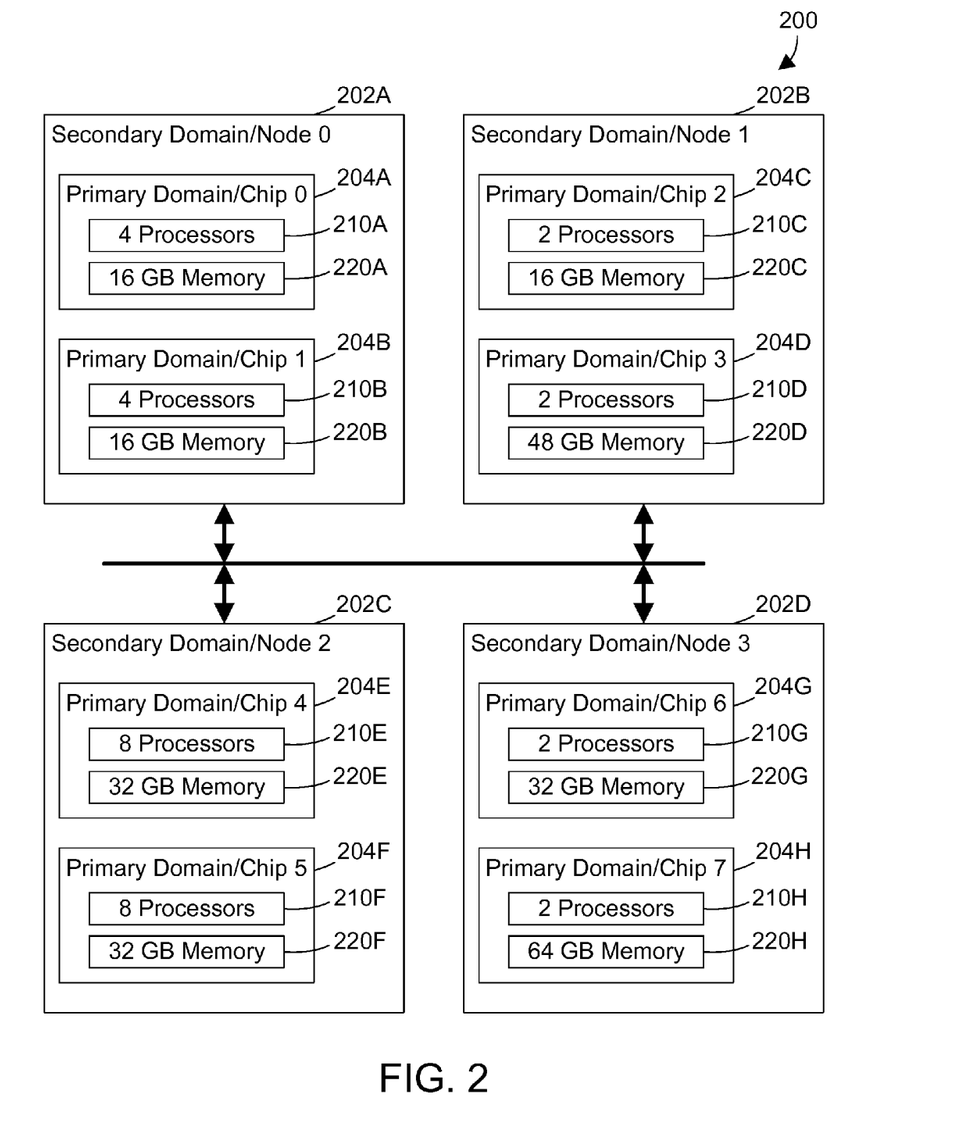
FIG. 2 is a block diagram of an example computer system that includes eight primary domains and four secondary domains.

Referring to FIG. 2, a computer system 200 is shown as an example of a computer system that includes hardware and memory that could be allocated to different logical partitions. The hardware is divided into a hardware domain hierarchy according to the physical boundaries of the hardware. We assume for this specific example that primary domains correspond to chips, while secondary domains correspond to nodes or drawers. Note, however, the concepts of primary domains and secondary domains could be applied to any suitable hardware hierarchy, whether currently known or developed in the future. Computer system 200 includes four secondary domains 202A, 202B, 202C and 202D. Each secondary domain includes two primary domains. Thus, secondary domain 202A includes primary domains 204A and 204B; secondary domain 202B includes primary domains 204C and 204D; secondary domain 202C includes primary domains 204E and 204F; and secondary domain 202D includes primary domains 204G and 204H. Each primary domain has physical processors and physical memory. Thus, primary domain 204A includes four processors 210A and 16 gigabytes (GB) of memory 220A; primary domain 204B includes four processors 210B and 16 GB of memory 220B; primary domain 204C includes two processors 210C and 16 GB of memory 220C; primary domain 204D includes two processors 210D and 48 GB of memory 220D; primary domain 204E includes eight processors 210E and 32 GB of memory 220E; primary domain 204F includes eight processors 210F and 32 GB of memory 220F; primary domain 204G includes two processors 210G and 32 GB of memory 220G; and primary domain 204H includes two processors 210H and 64 GB of memory 220H. With the hardware configuration of this sample computer system 200 shown in FIG. 2, the dynamic partition manager 122 in FIG. 1 allocates the resources to the logical partitions that need to be created.

Figure 3:
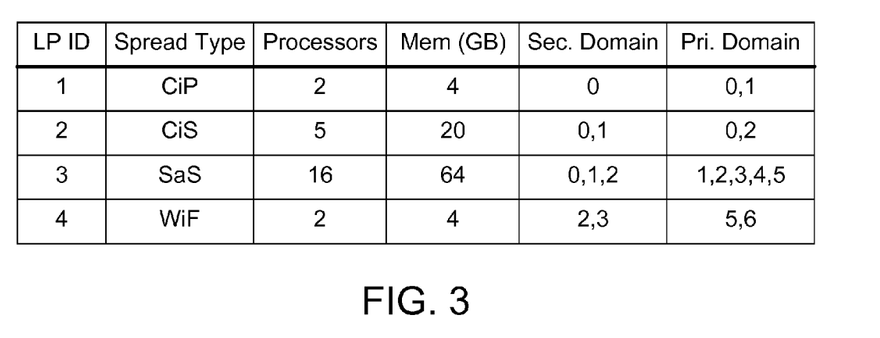
FIG. 3 is a table showing spread type for each of four logical partitions defined on the example computer system in FIG. 2.

FIG. 3 shows a table that specifies four logical partitions with their respective processor and memory requirements with logical partition IDs (LP ID) of 1-4 along the left column. The table in FIG. 3 specifies a "spread type", which is an indication of where the logical partition may fit in the computer system 200. Four specific spread types are shown in FIG. 3, including contain within primary (CiP); contain within secondary (CiS); spread across secondary (SaS); and wherever it fits (WiF). These spread types define how resources are allocated and memory affinity is computed for a particular logical partition. Spread types are discussed in more detail below.

Figure 4:
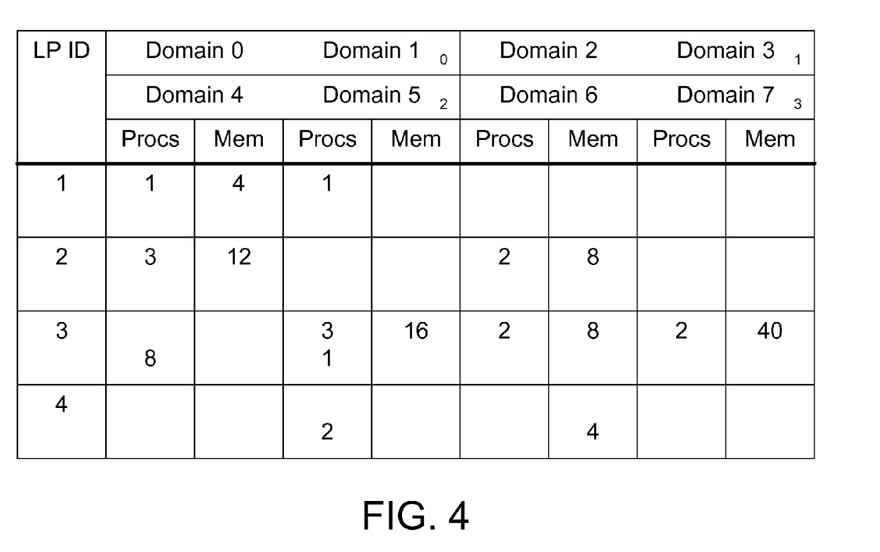
FIG. 4 is a table showing allocation of processors and memory to the four logical partitions.

The table in FIG. 4 represents the allocation of processors and memory in primary and secondary domains for each of the four logical partitions shown in FIG. 3. The domain numbers in FIG. 4 refer to the primary domains in FIG. 2, while the secondary domains are the small numbers to the right in each combination of two primary domains. Thus, secondary domain 0 (node/drawer 0) includes primary domains 0 and 1 (chip 0 and chip 1); secondary domain 1 includes primary domains 2 and 3 (chip 2 and chip 3); secondary domain 2 includes primary domains 4 and 5 (chip 4 and chip 5); and secondary domain 3 includes primary domains 6 and 7 (chip 6 and chip 7). The way to interpret the assignment for each partition in FIG. 4 is if the number is in the upper row in a cell then it is for the upper domain, and if the number is in the lower row in a cell then it is for the lower domain. Thus, for LP ID 2, the 3 in the first cell is for primary domain 0 since it's in the upper part of the cell. For LP ID 3, the 8 in the first cell is for primary domain 4 since it is in the lower part of the cell. For LP ID 3, there are two numbers in the third cell, a 3 above and a 1 below. This denotes 3 processors in primary domain 1 and 1 processor in primary domain 5.

Figure 5:
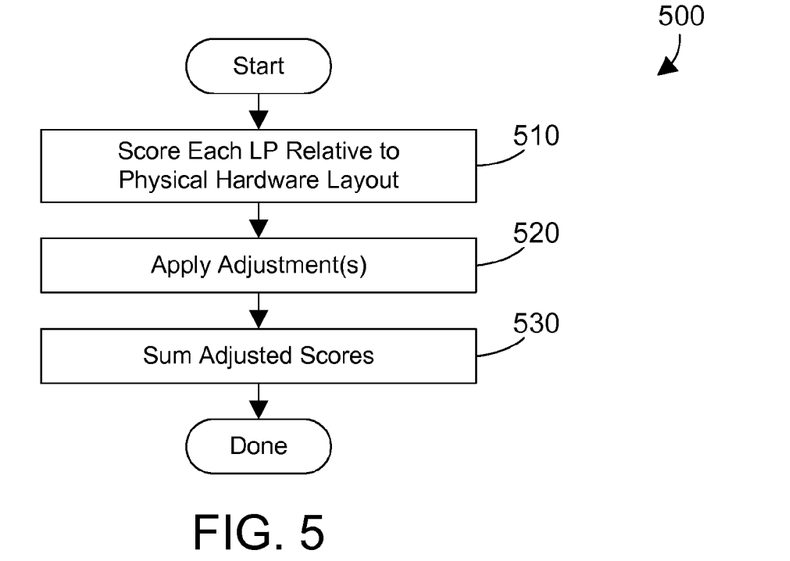
FIG. 5 is a flow diagram of a method for computing memory affinity for the computer system of FIG. 2.

Referring to FIG. 5, a method 500 shows the steps in computing memory affinity for a computer system. First, each logical partition is scored relative to the physical hardware layout of the computer system (step 510). One or more adjustments may be applied (step 520). Examples of adjustments that could be applied in step 520 include a page table adjustment, a weight adjustment, and a shared memory adjustment. A page table adjustment could include, for example, a factor that reduces the memory affinity based on location of a hardware page table or a virtual page table. A weight adjustment could include, for example, a factor that reduces the memory affinity according to the number of resources used in a logical partition divided by the total number of resources in the computer system. A shared memory adjustment could include, for example, a factor that reduces the memory affinity when memory is shared with other logical partitions. For example, a shared memory adjustment could account for the shared pool size, relative percentages of shared memory configurations against each other if the total is greater than the pool size, actual usage percentages of the shared memory pool, etc. The adjusted scores for all of the logical partitions are then summed (step 530) to arrive at a memory affinity score for the computer system, such as computer system 200 in FIG. 2. Method 500 is then done.

Figure 6:
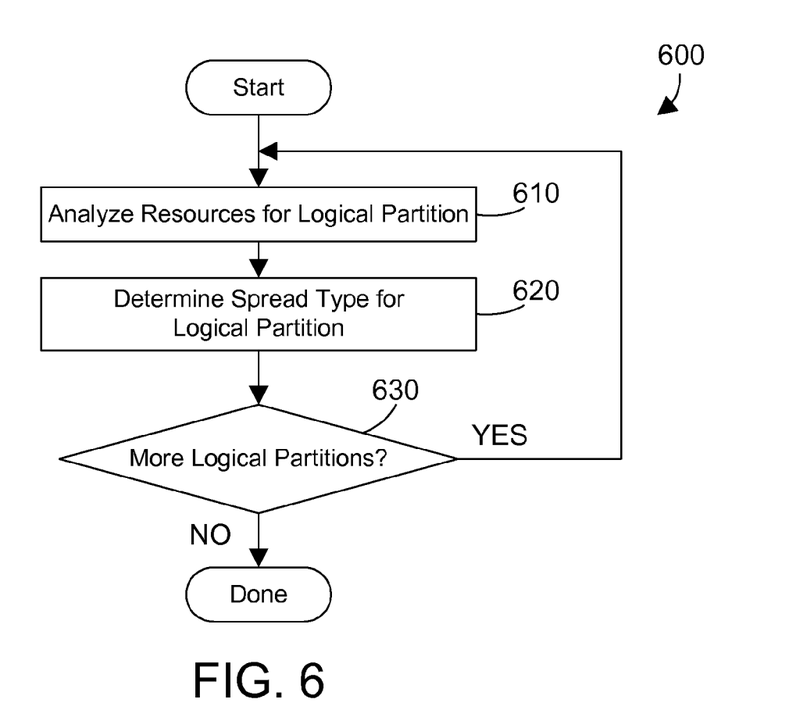
FIG. 6 is a flow diagram of a method for determining spread type for each logical partition.

Step 510 in FIG. 5 scores each logical partition relative to the physical hardware layout. This may be done using the concept of a "spread type." Referring to FIG. 6, a method 600 analyzes resources for a logical partition (step 610) and determines a spread type for the logical partition (step 620). When there are more logical partitions (step 630=YES), method 600 loops back to step 610 and continues until there are no more logical partitions (step 630=NO). Method 600 is then done.

Figure 7:
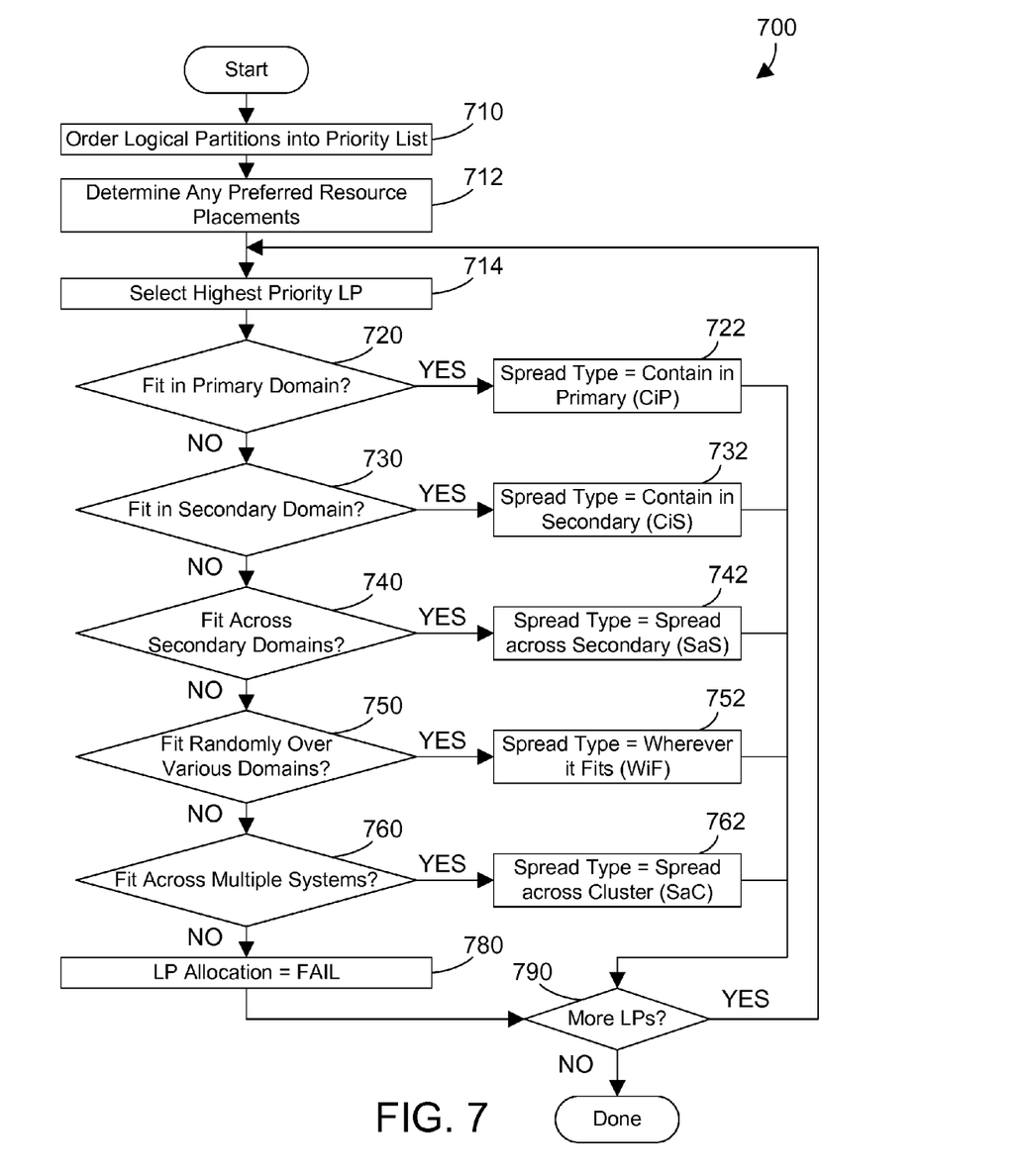
FIG. 7 is a flow diagram of a method for defining spread type for each logical partition.

Spread type is determined for each logical partition based on where the logical partition could theoretically fit in the computer system. The concept of spread type is powerful because it reflects actual hardware boundaries in the hardware domain hierarchy. When a logical partition may be allocated in a single primary domain (e.g., chip), the logical partition will have very high memory affinity. The number of resources required for a logical partition relative to the resources provided in the various domains will determine the spread type for the logical partition. Referring to FIG. 7, method 700 shows one suitable way to define spread type for a logical partition. The logical partitions are ordered into a priority list (step 710). The priority list lists the logical partitions in priority order so the highest priority logical partition is considered first, the next highest priority logical partition is considered next, etc. Any preferred resource placements are determined (step 712). For example, a system administrator may specify resources for a specified logical partition be allocated in a specified domain for some particular reason, such as expected maintenance, security, etc. The highest priority logical partition is then selected from the priority list (step 714). If the logical partition will fit in a primary domain (step 720=YES), the spread type is Contain in Primary (CiP) (step 722). If the logical partition will not fit in a primary domain (step 720=NO), but will fit in a secondary domain (step 730=YES), the spread type is Contain in Secondary (CiS) (step 732). If the logical partition will not fit in a secondary domain (step 730=NO), but will fit across secondary domains in a reasonably balanced manner (step 740=YES), the spread type is Spread across Secondary (SaS) (step 742). If the logical partition will not fit across secondary domains in a reasonably balanced manner (step 740=NO) but will fit randomly over various domains (step 750=YES), the spread type is Wherever it Fits (WiF) (step 752). If the logical partition will not fit randomly over various domains (step 750=NO) but will fit across multiple systems in the cluster (step 760=YES), the spread type is Spread across Cluster (SaC) (step 762). If the logical partition will not fit across multiple systems in the cluster (step 760=NO), the logical partition cannot be allocated to computer(s) to include system clusters, so the logical partition allocation fails (step 780). When there are more logical partitions in the priority list to process (step 790=YES), method 700 loops back to step 714 and continues until there are no more logical partitions in the priority list to process (step 790=NO). Method 700 is then done. By creating a priority list for the logical partitions, then determining spread type from highest to lowest priority, the higher priority logical partitions have a greater likelihood of having better memory affinity.

Figure 8:
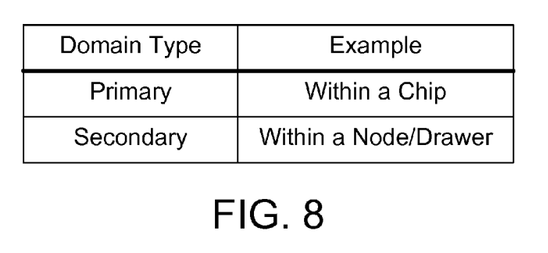
FIG. 8 is a table showing sample primary and secondary domains.

FIG. 8 shows a table that illustrates two possible hardware layers in a hardware domain hierarchy. For the specific example shown in FIG. 2, a primary domain corresponds to a chip, while a secondary domain corresponds to a node or drawer. Of course, other hardware domain hierarchies are possible, and are within the scope of the disclosure and claims herein.

Figure 9:
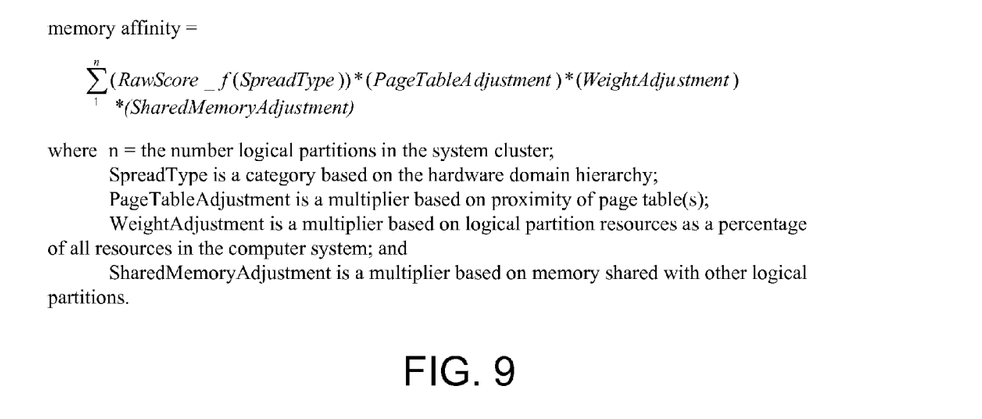
FIG. 9 is an equation for computing memory affinity for a computer system by summing memory affinity for each of the logical partitions.

Referring to FIG. 9, an equation is shown for computing memory affinity for a computer system, such as computer system 200 shown in FIG. 2. Note the equation in FIG. 9 is one specific implementation for the steps shown in method 500 in FIG. 5. The memory affinity for the computer system is represented by the equation:

$$\sum_{1}^{n} (RawScore\_f(SpreadType)) * (PageTableAdjustment) * (WeightAdjustment) * (SharedMemoryAdjustment)$$

The memory affinity for a computer system is thus a sum of adjusted scores from the individual logical partitions. The adjusted score for a logical partition is determined based on a RawScore, which is a function of the SpreadType. Spread- Type is a category based on the hardware domain hierarchy. One suitable hardware domain hierarchy includes five different spread types, as shown in FIG. 7 and discussed above. The raw score may be adjusted by a PageTableAdjustment factor, by a WeightAdjustment factor, and by a SharedMemoryAdjustment factor. The PageTableAdjustment factor is a multiplier based on proximity of one or more page tables, both hardware and virtual. For example, the PageTableAdjustment could be a factor less than one that represents a reduction in score due to either a hardware page table or a virtual page table not being in an ideal location. The WeightAdjustment factor is a multiplier based on logical partition resources as a percentage of all resources in the computer system. The SharedMemoryAdjustment factor is a multiplier based on memory shared with other logical partitions. The equation in FIG. 9 allows computing a memory affinity score for the computer system. Note the equation in FIG. 9 could be used to score a current memory affinity, and could also be used to score a potential memory affinity, in order to determine whether reallocation of resources is warranted to improve the memory affinity of the computer system.

The raw score in the equation of FIG. 9 is computed differently depending on the spread type. When the spread type is Contain in Primary (CiP), the primary domain is selected that has the largest percentage of processors or memory assigned to the partition, but is the smallest of the two percentages in a domain. If primary domain 0 has 60% of the processors and 20% of the memory, and primary domain 1 has 40% of the processors and 80% of the memory, then domain 1 is chosen as the starting domain to score from, since it has a larger percentage of the smallest value in the domain (40% vs 20%). The initial raw score equals the percent value used to pick the starting domain above, so in this example it is 40. The remaining percentage is then computed by subtracting the percent value from 100, thus 100−40=60. This is the multiplying factor to adjust the remaining resource assignments. All the remaining primary domains are examined to determine the balance percentage for each primary domain using the equation (100−|proc %−mem %|)*(proc %+mem %)/2. Then multiply the balance percentage for each primary domain by the adjustment factor, then divide by 100. In this case each domain's balance percentage added to the score is multiplied by 60% to reduce the score addition as a penalty for being outside the starting primary domain. The adjustments above thus provide a consistent penalty for the CiP spread type when resources are allocated outside a single primary domain. The initial raw score is then added to the total adjusted values, yielding the raw score for the CiP spread type of this logical partition.

When the spread type is Contain in Secondary (CiS), a secondary domain is selected that has the most total percentage of resources of combined processors and memory assigned to the partition. This is the starting domain. The initial raw score equals the percent value used to pick the starting secondary domain above. Then compute the remaining percentage, 100 minus the percent value for the starting secondary domain. Examine all remaining secondary domains and determine the balance percentage for each secondary domain using the equation: (100−|proc %−mem %|)* (proc %+mem %)/2. Multiply each balance percentage by the percent value remaining computed above, then divide by 100. The remaining percentage is similar to the penalty for CiP but looking at secondary domains instead of primary domains.

When the spread type is Spread across Secondary (SaS), examine all secondary domains, and determine the balance percentage for each secondary domain using the equation: (100−|proc %−mem %|)/100*(proc %+mem %)/2. There is no penalty for the SaS spread type, the only thing that matters is balance between secondary domains.

When the spread type is Wherever it Fits (WiF), examine all primary domains, and determine the balance percentage for each primary domain using the equation: (100−|proc %−mem %|)/100*(proc %+mem %)/2. There is no penalty for the WiF spread type, the only thing that matters is balance between primary domains.

When the spread type is Spread across Cluster (SaC), determine the percentage of resources each system has of the total logical partition resource allocation. These percentages are the weighting multipliers to the individual scores each system will have for the partition. The largest percentage is the multiplier used against the largest system raw score and the remaining percentage (100−largest percentage) is the remaining percentage "penalty" multiplier for the scores in the remaining systems. On each system compute raw scores individually, which may be any combination of 'CiP', 'CiS', 'SaS' or 'WiF' on the different systems. Multiply the raw scores computed on each system with its computed weighting percentage, then add up all the raw scores to get a total logical partition score across systems.

Page table adjustments may also depend on the spread type. Recall page table adjustments are one of the types of adjustments that may be performed in step 520 in FIG. 5. Each raw score computed above gets a possible negative adjustment depending on Hardware Page Table location and, if necessary, on Virtual Page Table location. This is another important factor in getting a consistently meaningful score regarding memory affinity. Dedicated memory partitions generally would only have a hardware page table, a page table that the hardware writes into as well as the firmware or the operating system. Shared memory partitions generally have both a hardware page table and a virtual page table. The virtual page table allows another level of indirection so the firmware can act virtually as the hardware would to manage the shared nature of memory between partitions. One possible implementation is to first determine the logical partition type, dedicated or shared. Then if dedicated and the location of the hardware page table is not optimal, adjust the raw score downward 10%. If the partition is shared, then depending on the importance of the hardware page table versus virtual page table relating to performance, the raw score may be adjusted downward, say 3% for non-optimal hardware page table placement and/or 7% for non-optimal virtual page table placement. It is generally important for best performance if the page tables reside on the same primary or secondary domain where the partition has processors assigned.

For the spread type Contain in Primary (CiP), determine the primary domains that have the same characteristics as the starting domain used for the raw score, i.e., domain(s) with the largest percentage of processors or memory assigned to the partition, but is the smallest of the two percentages in a domain. For the Contain in Secondary (CiS) spread type, determine the secondary domains that have the same characteristics as the starting domain used for the raw score, i.e., domain(s) with the same largest percentage of processor or memory assigned to the partition. For the Spread across Secondary (SaS) spread type, determine the secondary domains with processors assigned to the partition. For the Wherever it Fits (WiF) spread type, determine the primary domains with processors assigned to the partition. In each of the above cases, if the page table(s) reside in the same chosen domain(s), then there is no score penalty. If they reside in other domain(s), but one with processors assigned to the partition, then perhaps a small penalty is applied. If they reside outside of any domain used by the logical partition, then maximum penalties may be applied.

As stated above, step 520 in FIG. 5 may include a weight adjustment. A weight adjustment could include, for example, a factor that reduces the memory affinity according to the number of resources used in a logical partition divided by the total number of resources in the computer system. First, determine which partitions to include. Nonfunctional partitions, i.e., those without processors and/or memory, can be excluded. There may be valid reasons to have nonfunctional partitions as resource place holders or temporary shells that should not factor into system scoring. Nonfunctional partitions would have partition scores of 0. Next, weight each included partition score, by giving each score a multiplying factor that is a percentage of the system score. In one implementation, calculate overall resource percentage in use by each partition, and use that percentage as the multiplying factor. The multiplying factors would total up to 100%, for example. Or, use partition priority order in assigning weights, or perhaps a combination of resource percentage and priority. Then multiply the partition scores with its weight/percentage, and add up to a system score.

Figure 10:
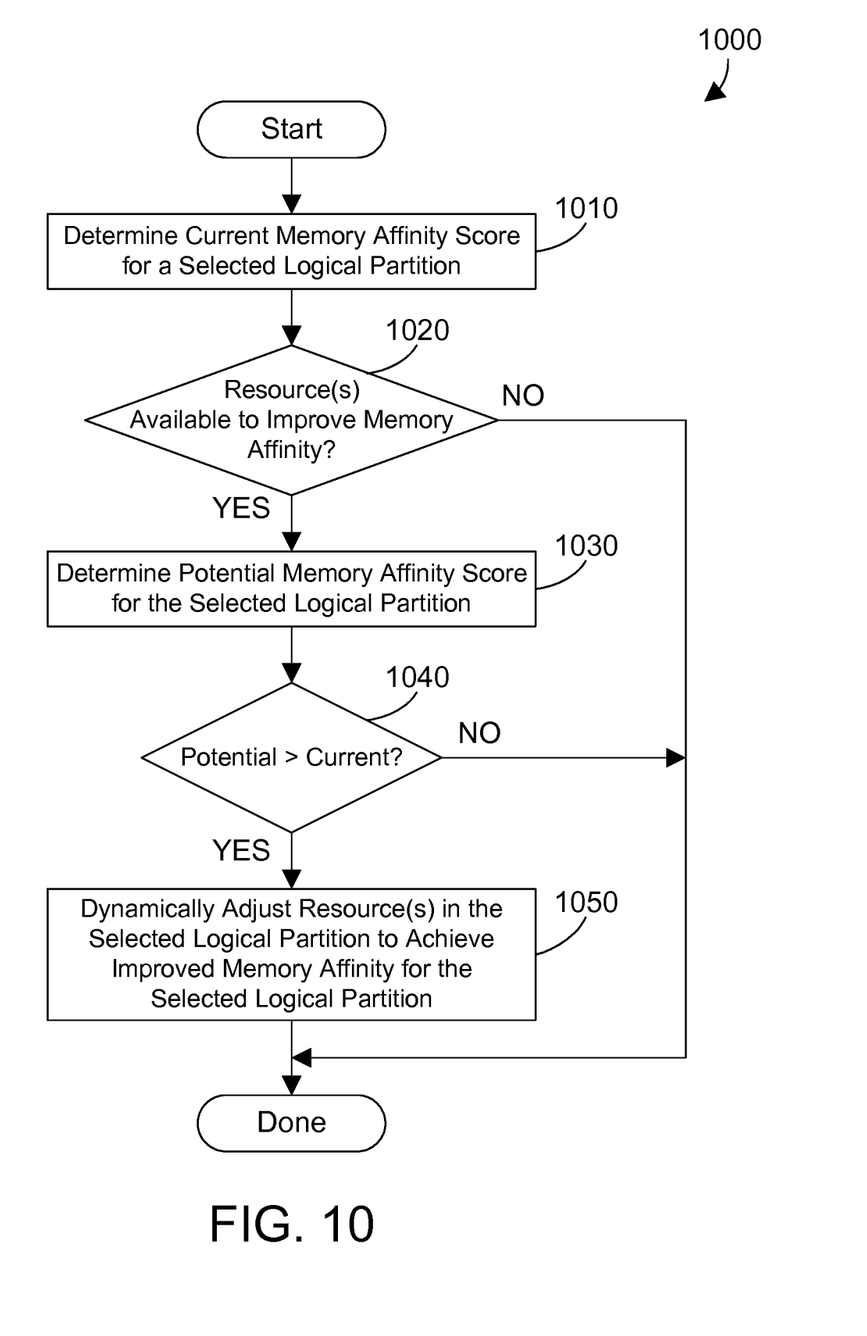
FIG. 10 is a flow diagram of a method for analyzing potential reallocation of resources within a logical partition based on memory affinity.

FIG. 10 shows a method 1000 for dynamically adjusting resource allocation in one or more logical partitions to improve memory affinity in the computer system, which will improve performance of the computer system. The current memory affinity score for a selected logical partition is determined (step 1010). When there are one or more resources available to improve memory affinity (step 1020=YES), the potential memory affinity score for the selected logical partition is determined (step 1030). When the potential memory affinity for the selected logical partition is greater than the current memory affinity (step 1040=YES), the allocation of resources in the selected logical partition is dynamically adjusted to achieve improved memory affinity for the selected logical partition (step 1050). Method 1000 is then done.

Figure 11:
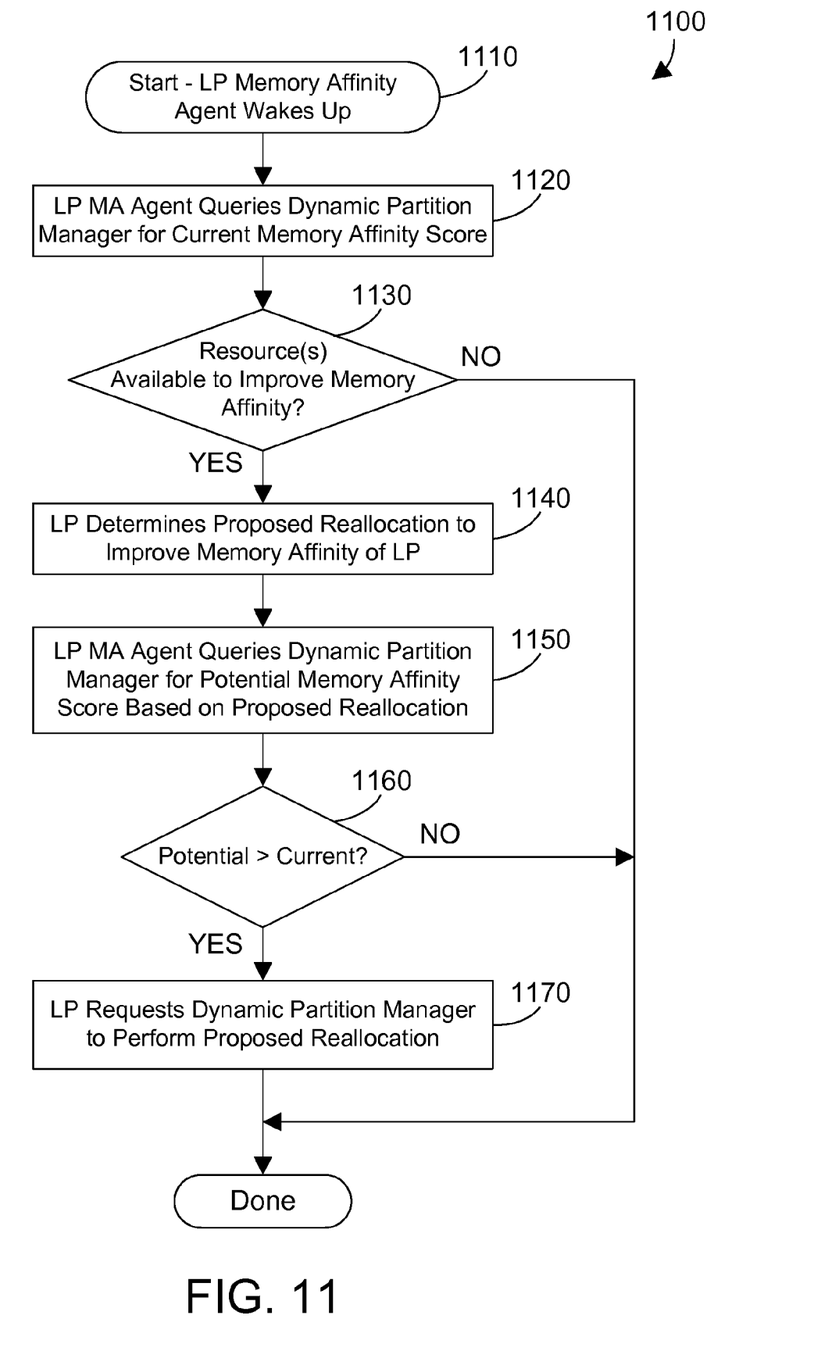
FIG. 11 is a flow diagram of a method for the logical partition memory agent to interact with the dynamic partition manager to achieve reallocation of resources within a logical partition based on memory affinity.

Referring to FIG. 11, a method 1100 shows the steps performed in a more specific example, where each logical partition includes a memory affinity agent (e.g., 126A in FIG. 1) that requests computations of memory affinity scores by the memory affinity computation mechanism 123. We assume for this example that the memory affinity agent in a logical partition wakes up every so often, say five minutes, to check to see if its memory affinity can be improved. Thus, method 1100 in FIG. 11 begins when the memory affinity agent in a selected logical partition wakes up (step 1110). The memory affinity agent (referred to in FIG. 11 as MA Agent) for a logical partition (referred to in FIG. 11 as LP) queries the dynamic partition manager to compute the current memory affinity score for the selected logical partition (step 1120). If there are no resources available to improve the memory affinity of the selected logical partition (step 1130=NO), method 1100 is done. If there is one or more resource available that could improve the memory affinity of a logical partition (step 1130=YES), the selected logical partition determines a proposed reallocation of resources in an attempt to improve the memory affinity of the logical partition (step 1140). The memory affinity agent in the selected logical partition queries the dynamic partition manager for a potential memory affinity score based on the proposed reallocation that was determined in step 1140 (step 1150). If the potential memory affinity score is not greater than the current memory affinity score (step 1160=NO), method 1100 is done. If the potential memory affinity score is greater than the current memory affinity score (step 1160=YES), the logical partition then requests the dynamic partition manager to perform the proposed reallocation of resources (step 1170). Note that the term "reallocation of resources" is used broadly to mean any change in resource allocation to the selected logical partition. For example, let's assume that an unallocated memory block is available after initial program load, and the selected logical partition discovers it may improve its memory affinity by having the unallocated memory block allocated to itself. The allocation of this unallocated block of memory to the selected logical partition is a "reallocation" in the sense that the total resources in the selected logical partition does not change.

Figure 12:
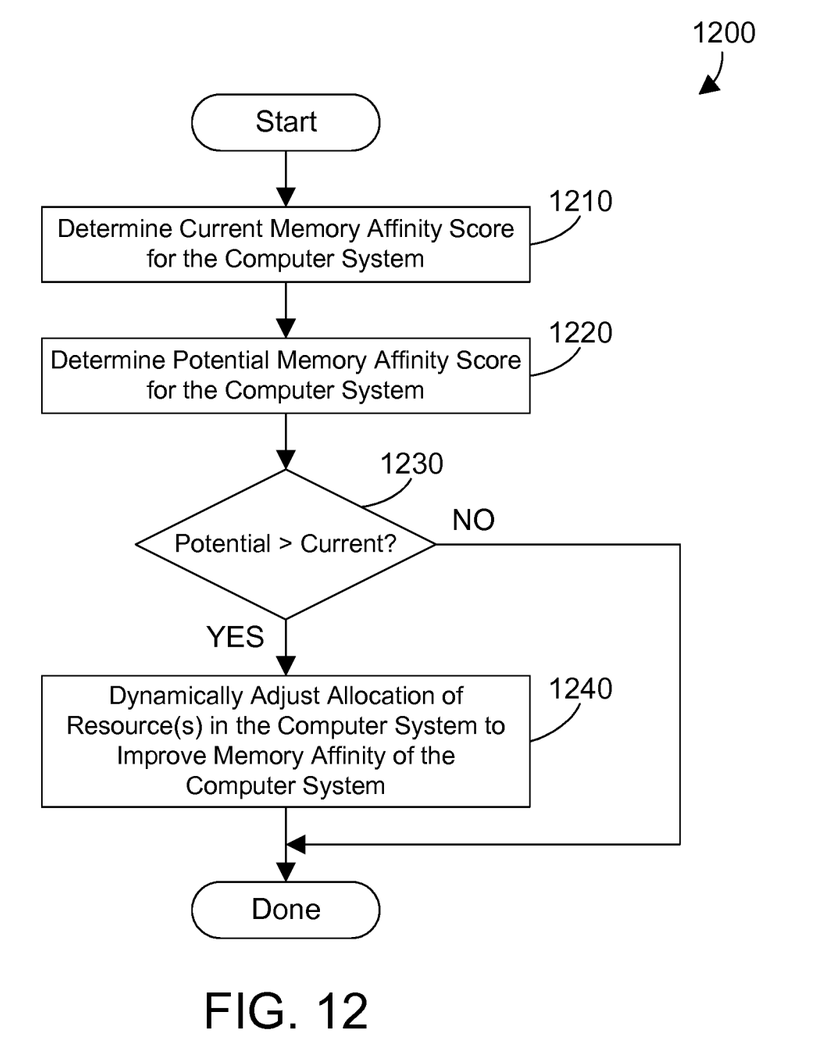
FIG. 12 is a flow diagram of a method for analyzing potential reallocation of resources in a computer system based on memory affinity of the computer system.

In addition to determining memory affinity for individual logical partitions, a memory affinity score for the computer system that includes all the logical partitions may be determined. Referring to FIG. 12, a method 1200 begins by determining the current memory affinity score for the computer system (step 1210). A potential memory affinity score is determined for the computer system (step 1220) based on some proposed reallocation of resources in the computer system. When the potential memory affinity is greater than the current memory affinity (step 1230=YES), the allocation of one or more resources in the computer system is dynamically adjusted to improve memory affinity of the computer system (step 1240). Method 1200 is then done.

A detailed example is now provided to illustrate the concepts presented above. First, we assume the allocation in FIG. 4 is the current allocation of resources among the four logical partitions. LP ID 1 is spread type CiP and has less than ideal resource allocation since 1 processor is assigned to primary domain 1, and the remaining 1 processor is assigned to primary domain 0. The current unadjusted memory affinity score for LP ID1 is computed as follows. The primary domain with the largest percentage of the smallest of the two types of resources is domain 0, because domain 0 has 50% of the processors and 100% of the memory, while domain 1 has 50% of the processors and 0% of the memory. So domain 0 is chosen (50%>0%). Next, the smallest of the percentages of processors or memory in the chosen domain is 50%, so the initial raw score is 50. The remaining percentage "penalty" is 100−50=50 (or 0.50). Compute the score for primary domain 1 to add to the initial raw score of 50 by using (100−|proc %−mem %|)*(proc %+mem %)/2. Domain 1 has one processor and no memory so the end result will be 0. Now apply the remaining "penalty" percentage, 0*0.50=results in 0. Add the initial score of 50 with the remaining primary domain score of 0, results in 50 of course for and unadjusted affinity score of LP ID 1.

LP ID 2 is spread type CiS, and has less than ideal resource allocation since resources are spread into secondary domain 0 and secondary domain 1. The current unadjusted memory affinity score is computed as follows. The secondary domain with the largest percentage of resources is domain 0 ((60% processors+60% memory)/2=60% of the total). The initial raw score is 60. The remaining percentage "penalty" is 100−60=40 (or 0.40). Compute the score for secondary domain 1 to add to the initial raw score of 60 by using (100−(40−40))*(40+40)/2, which yields (100−0)*(80)/2, which yields 100*40 divide by 100 to eliminate the multiplication factor to get a %, result is 40% (or 0.40). Now apply the remaining "penalty" percentage, 40*0.40 results in 16. Add the initial score of 60 with the remaining secondary domain score of 16, the result is 76 for an unadjusted memory affinity score for LP ID 2.

LP ID 3 is spread type SaS. The current unadjusted memory affinity score for LP ID 3 is computed using the formula (100−|proc %−mem %|)/100*(proc %+mem %)/2 for each secondary domain. For secondary domain 0, the memory affinity score is (100−|18.75−25|)/100*(18.75+25)/2=21. For secondary domain 1, the current memory affinity score is (100−|25−75|)/100*(25+75)/2=25. For secondary domain 2, the current memory affinity score is (100−|56.25−0|)/100*(56.25+0)/2=12. For secondary domain 3, the current memory affinity score is (100−|0−0|)/100*(0+0)/2=0. Thus, the current unadjusted memory affinity score for LP ID 3 is the sum of the memory affinity scores of the four secondary domains, namely 21+25+12+0=58.

LP ID 4 is spread type WiF. The current unadjusted memory affinity score for LP ID 3 is computed using the formula (100−|proc %−mem %|)/100*(proc %+mem %)/2 for each primary domain. For primary domain 5, (100−|100−0|)/100*(100+0)/2=0. For primary domain 6, (100−|0−100|)/100*(0+100)/2=0. The memory affinity score for LP ID 4 is the sum of the memory affinity scores for the two primary domains, namely 0+0=0.

The total unadjusted memory affinity score for the computer system is the average for all four logical partitions, which is (50+76+58+0)/4=46. Of course, as stated above with respect to step 520 in FIG. 5, the unadjusted memory affinity score could then be adjusted with any or all of the following: a page table adjustment, a weight adjustment, and a shared memory adjustment.

Figure 13:
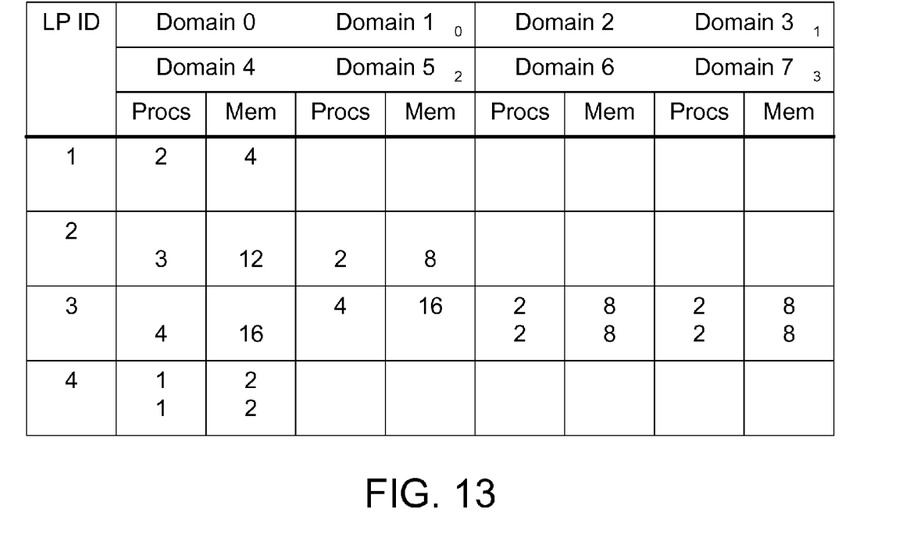
FIG. 13 is a table showing potential allocation of processors and memory to the four logical partitions.

The table in FIG. 13 shows a potential reallocation of resources for the four logical partitions. LP ID 1 is spread type CiP. The potential unadjusted memory affinity score for LP ID 1 for the allocation shown in FIG. 13 is computed as follows. The primary domain with the largest percentage of the smallest of the two types of resources is domain 0, because domain 0 has 100% of the processors and 100% of the memory, while domain 1 has 0% of the processors and 0% of the memory. So domain 0 is chosen (100%>0%). Next, the smallest of the percentages of processors or memory in the chosen domain is 100%, so the initial raw score is 100. There is no "penalty" because all processors and memory are contained in the same primary domain, namely Domain 0. As a result, LP ID 1 has a perfect unadjusted potential memory affinity score of 100.

LP ID 2 is spread type CiS. The potential unadjusted memory affinity score for LP ID 2 for the allocation shown in FIG. 13 is computed as follows. The secondary domain with the largest percentage of resources is domain 2 ((100% processors+100% memory)/2=100% of the total). The initial raw score is 100. There is no "penalty" because all resources for LP ID 2 are contained within a single secondary domain. As a result, LP ID 2 has a perfect unadjusted potential memory affinity score of 100.

LP ID 3 is spread type SaS. The potential unadjusted memory affinity score for LP ID 3 for the allocation shown in FIG. 13 is computed using the formula (100−|proc %−mem %|)/100*(proc %+mem %)/2 for each secondary domain. For secondary domain 0, the memory affinity score is (100−|25−25|)/100*(25+25)/2=25. For secondary domain 1, the current memory affinity score is (100−|25−25|)/100*(25+25)/2=25. For secondary domain 2, the current memory affinity score is (100−|25−25|)/100*(25+25)/2=25. For secondary domain 3, the current memory affinity score is (100−|25−25|)/100*(25+25)/2=25. Thus, the current unadjusted memory affinity score for LP ID 3 is the sum of the memory affinity scores of the four secondary domains, namely 25+25+25+25=100. LP ID 3 thus has a perfect unadjusted potential memory affinity score of 100.

LP ID 4 is spread type WiF. The potential unadjusted memory affinity score for LP ID 4 for the allocation shown in FIG. 13 is computed using the formula (100−|proc %−mem %|)/100*(proc %+mem %)/2 for each primary domain. For primary domain 0, (100−|50−50|)/100*(50+50)/2=50. For primary domain 4, (100−|50−50|)/100*(50+50)/2=50. The memory affinity score for LP ID 4 is the sum of the memory affinity scores for the two primary domains, namely 50+50=100.

The total unadjusted potential memory affinity score for the computer system based on the potential allocation shown in FIG. 13 is the average for all four logical partitions, which is (100+100+100+100)/4=100. This shows the proposed reallocation in FIG. 13 results in perfect memory affinity before making any page table adjustment, weight adjustment, or shared memory adjustment. These scores could be adjusted as described above, and when the potential memory affinity score is greater than the current memory affinity score, the dynamic partition manager may dynamically reallocate resources without input from any human user to achieve an improved memory affinity score.

The memory affinity score for one logical partition could be improved at the expense of a worse memory affinity score for a different logical partition. For example, a first logical partition may have a high priority, and a potential reallocation of resources is identified that would increase the memory affinity of the first logical partition by 20% at the expense of a 5% reduction in memory affinity for a second logical partition that has lower priority. The dynamic partition manager can include any suitable heuristics for making suitable tradeoffs and decisions regarding resource reallocation. The dynamic partition manager may also consider memory affinity of individual logical partitions, as well as memory affinity of the overall computer system. Again, suitable heuristics could be used that could, for example, reject a proposed reallocation that improves memory affinity of one logical partition at the expense that is deemed too costly of a different logical partition, while accepting a proposed reallocation that improves memory affinity of one logical partition at the expense that is deemed acceptable of a different logical partition. Any suitable way for the dynamic partition manager to decide when to perform dynamic resource allocation to improve memory affinity of one or more logical partitions in a logically partitioned computer system, whether currently known or developed in the future, is within the scope of the disclosure and claims herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claims and disclosure herein provide a way to compute current memory affinity and potential memory affinity to help determine whether a reallocation of resources between nodes may improve memory affinity for a logical partition or for the computer system. If so, the reallocation of resources is performed so memory affinity for the logical partition or computer system is improved. Memory affinity is computed relative to the physical layout of the resources according to a hardware domain hierarchy that includes a plurality of primary domains and a plurality of secondary domains.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for computing memory affinity for a plurality of logical partitions based on a hardware domain hierarchy in a computer system, the method comprising the steps of:
   selecting one of the plurality of logical partitions;
   computing memory affinity for the computer system based on the hardware domain hierarchy in the computer system, the hardware domain hierarchy including at least one primary domain and at least one secondary domain, by performing the steps of:
   (A) ordering the plurality of logical partitions into a priority list that lists the plurality of logical partitions in priority order;
   (B) selecting the next logical partition in the priority list;
   (C) assigning a spread type to the selected logical partition based on where the logical partition could theoretically fit in the computer system based on hardware boundaries in the hardware domain hierarchy in the computer system;
   (D) computing a raw score for the selected logical partition based on the assigned spread type for the logical partition;
   (E) multiplying the raw score by at least one adjustment factor to generate an adjusted score for the selected logical partition; and
   (F) repeating steps (B), (C), (D) and (E) for each of the plurality of logical partitions in the priority list; and
   (G) summing the adjusted scores for the plurality of logical partitions to compute the memory affinity for the computer system.

2. The method of claim 1 wherein the at least one adjustment factor comprises:
   a page table adjustment factor based on location of at least one page table relative to other resources in the selected logical partition; and
   a weight adjustment factor based on percentage of resources in the selected logical partition compared to all resources in the computer system.

3. The method of claim 2 wherein the at least one adjustment factor further comprises:
   a shared memory partition factor when memory in the selected logical partition is shared with at least one other logical partition.

4. The method of claim 1 further comprising the steps of:
   determining from the memory affinity computation mechanism a current memory affinity for the selected logical partition based on a current allocation of resources in the selected logical partition;
   determining from the memory affinity computation mechanism a potential memory affinity for the selected logical partition based on a proposed reallocation of resources in the selected logical partition; and
   reallocating the resources in the selected logical partition when the potential memory affinity is greater than the current memory affinity.

5. The method of claim 1 wherein each of the at least one primary domain comprises an integrated circuit, and each of the at least one secondary domain comprises a node.

6. The method of claim 1 wherein the spread type comprises:
   contain in primary domain;
   contain in secondary domain;
   spread across secondary domains;
   wherever it fits across primary and secondary domains; and
   spread across cluster.

7. The method of claim 1 wherein the memory affinity mechanism computes the memory affinity for the computer system using the equation:

$$\text{memory affinity} = \sum_{1}^{n} (RawScore\_f(SpreadType)) * (PageTableAdjustment) * (WeightAdjustment) * (SharedMemoryAdjustment)$$

where n=the number logical partitions in the system cluster;
   SpreadType is a category based on the hardware domain hierarchy;
   PageTableAdjustment is a multiplier based on proximity of page table(s);
   WeightAdjustment is a multiplier based on logical partition resources as a percentage of all resources in the computer system; and
   SharedMemoryAdjustment is a multiplier based on memory shared with other logical partitions.

8. A computer-implemented method executed by at least one processor for computing memory affinity for a computer system that includes a plurality of logical partitions, the method comprising the steps of:
   computing memory affinity using the equation:

$$\text{memory affinity} = \sum_{1}^{n} (RawScore\_f(SpreadType)) * (PageTableAdjustment) * (WeightAdjustment) * (SharedMemoryAdjustment)$$

where n=the number logical partitions in the system cluster;
   SpreadType is a category based on the hardware domain hierarchy;
   PageTableAdjustment is a multiplier based on proximity of page table(s);
   WeightAdjustment is a multiplier based on logical partition resources as a percentage of all resources in the computer system; and
   SharedMemoryAdjustment is a multiplier based on memory shared with other logical partitions.

9. The method of claim 8 further comprising the steps of:
   determining a current memory affinity for the computer system based on a current allocation of resources in the computer system;
   determining a potential memory affinity for the computer system based on a proposed reallocation of resources in the computer system; and
   reallocating the resources in the computer system when the potential memory affinity is greater than the current memory affinity.

10. The method of claim 8 wherein the SpreadType comprises:
- contained in primary domain;
- contained in secondary domain;
- spread across secondary domains;
- wherever it fits across primary and secondary domains; and
- spread across cluster.

11. The method of claim 1 further comprising dynamically adjusting allocation of a plurality of resources to the plurality of logical partitions when a potential memory affinity for the computer system exceeds a current memory affinity for the computer system.

* * * * *